US009996909B2

(12) United States Patent
Masuko et al.

(10) Patent No.: US 9,996,909 B2
(45) Date of Patent: Jun. 12, 2018

(54) CLOTHING IMAGE PROCESSING DEVICE, CLOTHING IMAGE DISPLAY METHOD AND PROGRAM

(71) Applicant: Rakuten, Inc., Tokyo (JP)

(72) Inventors: Soh Masuko, Tokyo (JP); Yasuyuki Hayashi, Tokyo (JP); Tetsuya Hoshi, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 637 days.

(21) Appl. No.: 14/424,444

(22) PCT Filed: May 10, 2013

(86) PCT No.: PCT/JP2013/063126
§ 371 (c)(1),
(2) Date: Feb. 27, 2015

(87) PCT Pub. No.: WO2014/034188
PCT Pub. Date: Mar. 6, 2014

(65) Prior Publication Data
US 2015/0206292 A1  Jul. 23, 2015

(30) Foreign Application Priority Data
Aug. 30, 2012  (JP) ................... 2012-190412

(51) Int. Cl.
*G06T 5/00*  (2006.01)
*G09G 5/00*  (2006.01)
(Continued)

(52) U.S. Cl.
CPC ......... *G06T 5/006* (2013.01); *G06Q 30/0643* (2013.01); *G06T 19/006* (2013.01);
(Continued)

(58) Field of Classification Search
CPC ................ G06Q 30/00; G06T 5/006
See application file for complete search history.

(56) References Cited

U.S. PATENT DOCUMENTS 5,850,222 A    12/1998  Cone
5,930,769 A *   7/1999  Rose ............... G06Q 30/06
                                            345/419

(Continued)

FOREIGN PATENT DOCUMENTS

CN    102193287 A    9/2011
JP    2001-211372 A   8/2001
(Continued)

OTHER PUBLICATIONS

Zugara, "Augmented reality "3D virtual fitting rooms"—The good and the bad", Zugara blog, dated Dec. 8, 2011. (Year: 2011).*
(Continued)

*Primary Examiner* — Mark A Fadok
(74) *Attorney, Agent, or Firm* — HEA Law PLLC

(57) ABSTRACT

A clothing image processing device acquires an image of a first item, the first item being placed in a projection direction of a projection device and worn on one of a plurality of parts of a human body; measures a position of a specific portion of the first item in the acquired image; determines a position of a second item based on the measured position of the specific portion and on a specific portion of the second item; adjusts, based on a position of a projection target onto which the projection device projects and the position of the second item, a size and position of an image of the second item that is to be projected onto the projection target; and controls the projection device so that the adjusted image of the second item is projected.

13 Claims, 19 Drawing Sheets

(51) Int. Cl.
*G09G 5/36* (2006.01)
*G09G 5/38* (2006.01)
*H04N 9/31* (2006.01)
*G06Q 30/06* (2012.01)
*G06T 19/00* (2011.01)
*G09G 5/377* (2006.01)

(52) U.S. Cl.
CPC ............... *G09G 5/00* (2013.01); *G09G 5/36* (2013.01); *G09G 5/377* (2013.01); *G09G 5/38* (2013.01); *H04N 9/3185* (2013.01); *H04N 9/3194* (2013.01); *G06T 2207/10004* (2013.01); *G06T 2207/20004* (2013.01); *G06T 2207/30196* (2013.01); *G06T 2207/30244* (2013.01); *G06T 2210/16* (2013.01); *G09G 2320/10* (2013.01); *G09G 2340/0464* (2013.01); *G09G 2340/12* (2013.01)

(56) References Cited

U.S. PATENT DOCUMENTS

| | | | |
|---|---|---|---|
| 7,328,119 | B1 | 2/2008 | Pryor et al. |
| 7,953,648 | B2 | 5/2011 | Vock |
| 8,359,247 | B2* | 1/2013 | Vock ............... G06Q 10/043 705/27.2 |
| 8,840,470 | B2 | 9/2014 | Zalewski et al. |
| 8,861,866 | B2* | 10/2014 | Zhang ............... G06K 9/00664 382/111 |
| 9,241,143 | B2 | 1/2016 | Kreiner et al. |
| 2004/0165154 | A1 | 8/2004 | Kobori et al. |
| 2006/0103627 | A1 | 5/2006 | Watanabe et al. |
| 2009/0190046 | A1 | 7/2009 | Kreiner et al. |
| 2010/0030578 | A1* | 2/2010 | Siddique ............ G06Q 10/0637 705/3 |
| 2010/0177968 | A1 | 7/2010 | Fry et al. |
| 2011/0011605 | A1 | 5/2011 | Nakamura et al. |
| 2011/0116055 | A1 | 5/2011 | Nakamura et al. |
| 2011/0199294 | A1* | 8/2011 | Vilcovsky ............ G02B 5/08 345/156 |
| 2011/0234481 | A1 | 9/2011 | Katz et al. |
| 2012/0086783 | A1* | 4/2012 | Sareen ............... G06N 3/006 348/47 |
| 2013/0185679 | A1* | 7/2013 | Fretwell ............... G06F 3/017 715/862 |
| 2013/0254066 | A1* | 9/2013 | Amacker ............. G06Q 30/06 705/26.8 |
| 2014/0052567 | A1* | 2/2014 | Bhardwaj ........ G06Q 30/0631 705/26.7 |
| 2014/0176565 | A1* | 6/2014 | Adeyoola ............ G06T 19/006 345/473 |

FOREIGN PATENT DOCUMENTS

| | | |
|---|---|---|
| JP | 2002-297119 A | 10/2002 |
| JP | 2003-055826 A | 2/2003 |
| JP | 2006-209563 A | 8/2006 |
| JP | 2008-203491 A | 9/2008 |
| JP | 2009-026112 A | 2/2009 |
| JP | 2010-061022 A | 3/2010 |
| WO | 2011/149092 A1 | 12/2011 |

OTHER PUBLICATIONS

Fitnet, "fitnect.hu", Fitnect webpage, dated Jul. 13, 2012 (Year: 2012).*
International Search Report for PCT/JP2013/063126 dated Jun. 11, 2013.
European Search Report dated Apr. 22, 2016 for the application No. EP13842798.4.

* cited by examiner

FIG.6

| STORE ID | SALES ITEM ID | NAME | CATEGORY | SUB-CATEGORY |
|---|---|---|---|---|
| S001 | T001 | DESIGNED T-SHIRT SPECIALLY MADE BY A | TOPS | T-SHIRTS |
| S001 | T002 | SKIRT SPECIALLY MADE BY A | BOTTOMS | LONG SKIRTS |

FIG.7

| STORE ID | SALES ITEM ID | SIZE CLASSIFICATION | IMAGE ID | PARTICULAR LINE WIDTH | RIGHT AND LEFT EDGE POSITIONS OF PARTICULAR LINE | CHEST WIDTH | WAIST | HIP | UPPER ARM CIRCUMFERENCE | LENGTH |
|---|---|---|---|---|---|---|---|---|---|---|
| S001 | T001 | M | P0001m | 50 | (10,50) (110,50) | 40 | – | – | 30 | 60 |
| S001 | T002 | S | P0002s | 35 | (20,20) (100,20) | – | 66 | 93 | – | 40 |

CLOTHING IMAGE PROCESSING DEVICE, CLOTHING IMAGE DISPLAY METHOD AND PROGRAM

CROSS REFERENCE TO RELATED APPLICATIONS

This application is a National Stage of International Application No. PCT/JP2013/063126 filed May 10, 2013, which claims priority from Japanese Patent Application No. 2012-190412 filed on Aug. 30, 2012. The contents of each of the above documents are incorporated herein by reference in their entirety.

TECHNICAL FIELD

The present invention relates to a clothing image processing device, a clothing image display method, and a program.

BACKGROUND ART

Projectors and other similar devices project an image onto a screen or the like. In one application of projectors, the positions of a projection surface and the projector as well as the image size are adjusted so that an actual-size image of an object is projected, thereby giving a user the true sense of the size of the object whose image is being projected.

In Patent Literature 1, there is disclosed a projection display system configured to acquire a distance to a projection surface that is optimum for a projector and change the size of an image of an object so that the object image projected on the projection surface at the optimum distance has the actual size of the object. The system further checks the actual distance to the projection surface and displays a message that informs of a difference between the actual distance and the optimum distance, thereby allowing for manual adjustment of the distance between the projection surface and the projector so as to reduce an error in the size of the projected image of the object.

CITATION LIST

Patent Literature

[PTL 1] JP 2010-061022 A

SUMMARY OF INVENTION

Technical Problem

Electronic commerce has become common, and the practice of ordering and purchasing on the Internet items to wear, such as clothing, shoes, and hats, is very popular. For a user who searches for clothing or a similar item of sales in electronic commerce or the like, information for selecting an item is usually limited to an image (images) of the item displayed on a display and formulaic text information such as clothing size. When it is the case, the user finds it difficult to check how well a displayed piece of clothing or similar item that is just an image and not tangible coordinates with a piece of clothing or a similar item that the user has on hand, or how well the displayed item will fit the user's body.

The clothing coordinates or the fit could be checked by using the technology of Patent Literature 1 and projecting an actual size image of clothing or the like. However, it is too much trouble to move the position of the projector or the position of an object to be paired with just to find a piece of clothing or a similar item to purchase.

The present invention has been made in view of the problem described above, and an object of the present invention is therefore to provide a technology that makes it easier than in the related art to check how well clothing or other items to wear that are not on hand coordinates with an item that is on hand.

Solution to Problem

In order to solve the above-mentioned problem, according to one embodiment of the present invention, there is provided a clothing image processing device, including: image acquiring means for acquiring from photographing means a photographed image of a first item, the first item being placed in a projection direction of a projection device and worn on a first part of a human body, the first part being one of a plurality of parts of the human body; measuring means for measuring a position of a specific portion of the first item in the acquired image, wherein the specific portion of the first item is determined by the first part; position determining means for determining a position of a second item, the second item being an item to be worn on a second part, the second part being one of the plurality of parts, based on the measured position of the specific portion of the first item and on a positional relation between a specific portion of the second item and the specific portion of the first item; projection destination recognizing means for recognizing a projection target onto which the projection device projects; image adjusting means for adjusting, based on a position of the recognized projection target and the position of the second item, a size and position of an image of the second item that is read out of an item information storing means and that is to be projected onto the projection target; and projection control means for controlling the projection device so that the adjusted image of the second item is projected.

Further, according to one embodiment of the present invention, there is provided a clothing image display method, including the steps of: acquiring from photographing means a photographed image of a first item, the first item being placed in a projection direction of a projection device and worn on a first part of a human body, the first part being one of a plurality of parts of the human body; measuring a position of a specific portion of the first item in the acquired image, wherein the specific portion of the first item is determined by the first part; determining a position of a second item, the second item being an item to be worn on a second part, the second part being one of the plurality of parts, based on the measured position of the specific portion of the first item and on a positional relation between a specific portion of the second item and the specific portion of the first item; recognizing a projection target onto which the projection device projects; adjusting, based on a position of the recognized projection target and the position of the second item, a size and position of an image of the second item that is read out of an item information storing means and that is to be projected onto the projection target; and controlling the projection device so that the adjusted image of the second item is projected.

Further, according to one embodiment of the present invention, there is provided a program for causing a computer to execute the processing of: acquiring from photographing means a photographed image of a first item, the first item being placed in a projection direction of a projection device and worn on a first part of a human body, the first part being one of a plurality of parts of the human body; measuring a position of a specific portion of the first item in the acquired image, wherein the specific portion of the first item is determined by the first part; determining a position of a second item, the second item being an item to be worn on a second part, the second part being one of the plurality of parts, based on the measured position of the specific portion of the first item and on a positional relation between a specific portion of the second item and the specific portion of the first item; recognizing a projection target onto which the projection device projects; adjusting, based on a position of the recognized projection target and the position of the second item, a size and position of an image of the second item that is read out of an item information storing means and that is to be projected onto the projection target; and controlling the projection device so that the adjusted image of the second item is projected.

According to one embodiment of the present invention, how well clothing or other items to wear that are not on hand coordinates with an item that is on hand can be checked more easily than in the related art.

In one aspect of the present invention, when the first part is an upper body, the measuring means may measure a position of shoulders of the first item as the specific portion.

In one aspect of the present invention, when the first part is a lower body, the measuring means may measure a position of hips of the first item as the specific portion.

In one aspect of the present invention, the first part and the second part may be different parts, the clothing image processing device may further include body information acquiring means for acquiring information that indicates a relation between a position of a portion of a human body that corresponds to the specific portion of the first item and a position of a portion of the human body that corresponds to the specific portion of the second item, and the position determining means may determine, based on the position of the specific portion of the first item and on the information that indicates the relation, the position of the second item when the first item is worn on the human body.

According to this aspect, an image of the second item that is adjusted in position to the user's body can be projected.

In one aspect of the present invention, based on information about a size of the second item, the image adjusting means may adjust the size of the image of the second item so that the size of the projected image of the second item matches the size of the second item.

According to this aspect, the size of the projected image of the second item can be matched to the actual size of the second item.

In one aspect of the present invention, the projection destination recognizing means may detect a position and tilt of a projection surface onto which the image of the second item is projected, and the image adjusting means may correct a shape of the image of the second item to be projected onto the projection surface, depending on the detected position and tilt of the projection surface.

According to this aspect, a distortion of the projected image can be prevented even when the direction of the projection surface and the direction of the projection device are tilted with respect to each other.

In one aspect of the present invention, the image adjusting means may process the image of the second item so that the first item is prevented from overlapping with the projected image of the second item. In particular, when a sub-type of the second item is a sub-type determined in advance, the image adjusting means may process the image of the second item so that the first item is prevented from overlapping with the projected image of the second item.

According to this aspect, the images of the first item and the second item that are coordinated with each other can look more naturally.

In one aspect of the present invention, the clothing image processing device may further include means for determining a first type into which the first item is classified, based on the photographed image of the first item.

According to this aspect, the user can omit the operation of specifying the type of the first item.

In one aspect of the present invention, the image adjusting means may change a mode of display of the second item based on a result of comparison between a size of a user with respect to clothing and the size of the second item.

According to this aspect, the user can check more easily whether the size of the second item fits the user's body.

In one aspect of the present invention, the image adjusting means may estimate the size of the user with respect to clothing based on an image of the user, and compare the estimated size of the user with the size of the second item.

According to this aspect, the user does not need to input information of his/her size.

In one aspect of the present invention, the clothing image processing device may further include means for switching the second item based on photographed body movement of a user.

In one aspect of the present invention, the clothing image processing device may further include means for advancing electronic commerce processing with respect to the second item, based on photographed body movement of a user.

BRIEF DESCRIPTION OF DRAWINGS

FIG. 6 shows an example of sales item information that is transmitted from a virtual shopping mall server.

FIG. 7 shows an example of size image information that is transmitted from the virtual shopping mall server.

DESCRIPTION OF EMBODIMENT

Figure 1:
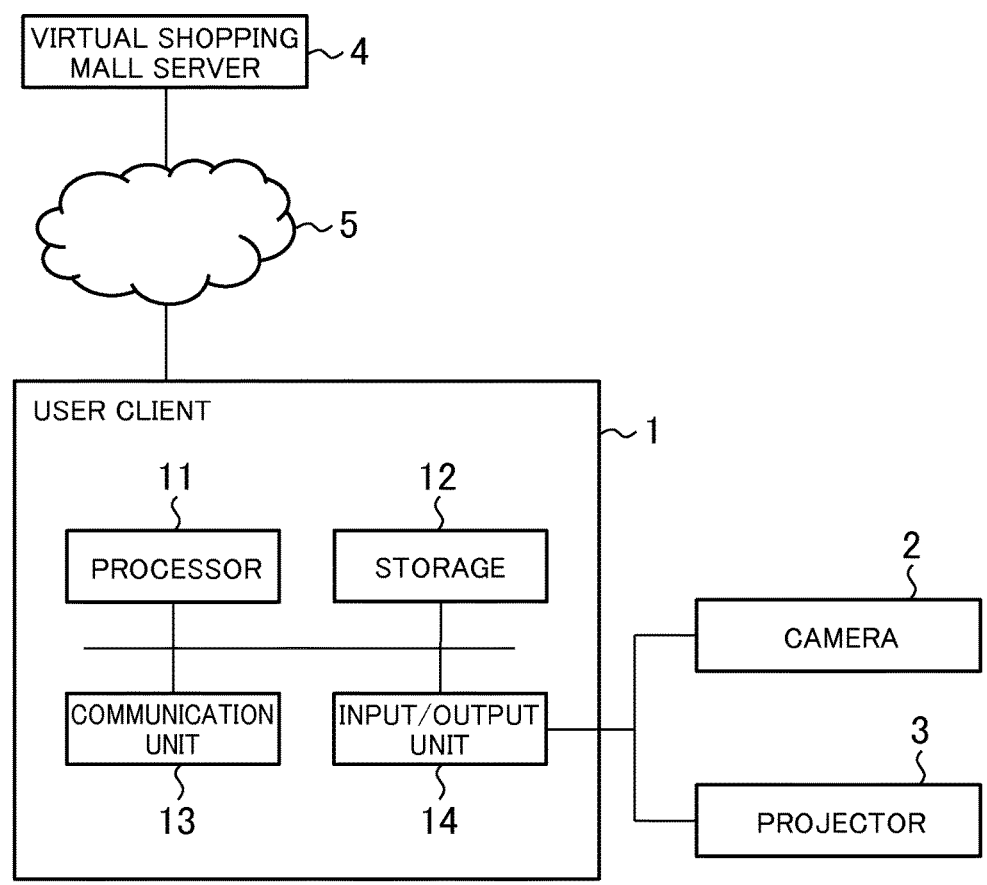
FIG. 1 is a diagram illustrating an example of the configuration of an electronic commerce system according to an embodiment of the present invention.

An embodiment of the present invention is described below with reference to the drawings. A duplicate description on components denoted by the same reference characters is omitted. The following description is centered on an embodiment in which the present invention is applied to an electronic commerce system that sells items to wear such as clothing and shoes (hereinafter also referred to as "clothing and the like" or "clothing or the like").

FIG. 1 is a diagram illustrating an example of the configuration of the electronic commerce system according to the embodiment of the present invention. The electronic commerce system includes a user client 1, a camera 2, a projector 3, and a virtual shopping mall server 4. Those are connected to one another via a network 5, which is the Internet or the like.

The user client 1 is a computer operated by a user, for example, a personal computer or a portable terminal. The user client 1 includes a processor 11, storage 12, a communication unit 13, and an input/output unit 14.

The processor 11 operates as programmed by a program stored in the storage 12. The processor 11 controls the communication unit 13 and the input/output unit 14. The program may be provided via the Internet or the like, or may be provided by being stored in a computer-readable storage medium such as a DVD-ROM.

The storage 12 is constructed from a memory element such as a RAM or a flash memory, or from a hard disk drive or the like. The storage 12 stores the program described above. The storage 12 also stores information and computation results input from other components.

The communication unit 13 implements a function of holding communication to and from other devices such as the virtual shopping mall server 4, and is constructed from, for example, an integrated circuit that constructs a cable LAN or from a network card that has a communication terminal. The communication unit 13, under control of the CPU 11, inputs information received from other devices to the CPU 11 or the storage 12 and transmits information to other devices.

The input/output unit 14 is a circuit that exchanges information with a display output device or other input/output devices, and is constructed from, for example, a graphic board that causes a display output device to output an image, and a USB controller that acquires data from input devices such as a keyboard, a mouse, and the camera 2. The input/output unit 14, under control of the processor 11, outputs image data and the like to a display output device and acquires, via the input devices, information from the operator (user) and data of an image acquired by the camera 2. One of display output devices connected to the input/output unit 14 is the projector 3, and a liquid crystal display device or the like may additionally be connected to the input/output unit 14.

The camera 2 is, in the electronic commerce system described below, a device that acquires a visible image and a depth image. The depth image is made up of pixels arranged two-dimensionally, and each pixel has information about how far an object that is placed in the direction of the pixel is from the camera 2 (a distance). Each pixel included in the depth image may have three-dimensional coordinates of an object that is placed in the direction of the pixel. A part of the camera 2 that acquires the depth image determines the distance based on, for example, an infrared ray radiated to and reflected by an object as in Kinect (trademark). A laser range finder, a camera projection system, a stereo camera, or the like may be used instead to acquire the distance.

The projector 3 is a projection device that includes a light, a lens, and an element for controlling the intensity of output light for each pixel. The projector 3 projects an image that is represented by image data input from the input/output unit 14 onto a projection target placed beyond the lens. A characteristic of the projector 3 is that the size of a projected image is larger when the distance from the projector 3 to a projection surface facing the projector 3 is greater. A photographing range of the camera 2 in which the camera 2 takes an image of an object overlaps with a projection range in which the projector 3 projects an image. It is necessary to correct in advance a gap between a point in an image that is photographed by the camera 2 and a point in an image that is projected by the projector 3. A premise of the description given here is that calibration for the gap between the points is performed in advance.

The virtual shopping mall server 4 is a server that implements functions of stores conducting business in electronic commerce. More specifically, the virtual shopping mall server 4 implements a virtual shopping mall made up of a plurality of electronic stores, and provides functions such as sales item search, sales item introduction, and payment/logistics assistance. The operator of each store updates, via the network 5, a sales item database stored on the virtual shopping mall server 4, and acquires information of sales items purchased by users. The virtual shopping mall server 4 can be, for example, a server computer installed in a data center. The virtual shopping mall server 4 also implements, by executing programs, a function of storing a database of sales item information about an item to be sold in storage means, and functions for advancing electronic commerce. The latter functions are, for example, a function of executing purchase processing for a sales item that a user wishes to purchase, and a function of storing sales items that a user is considering to purchase as a favorites list.

Figure 2:
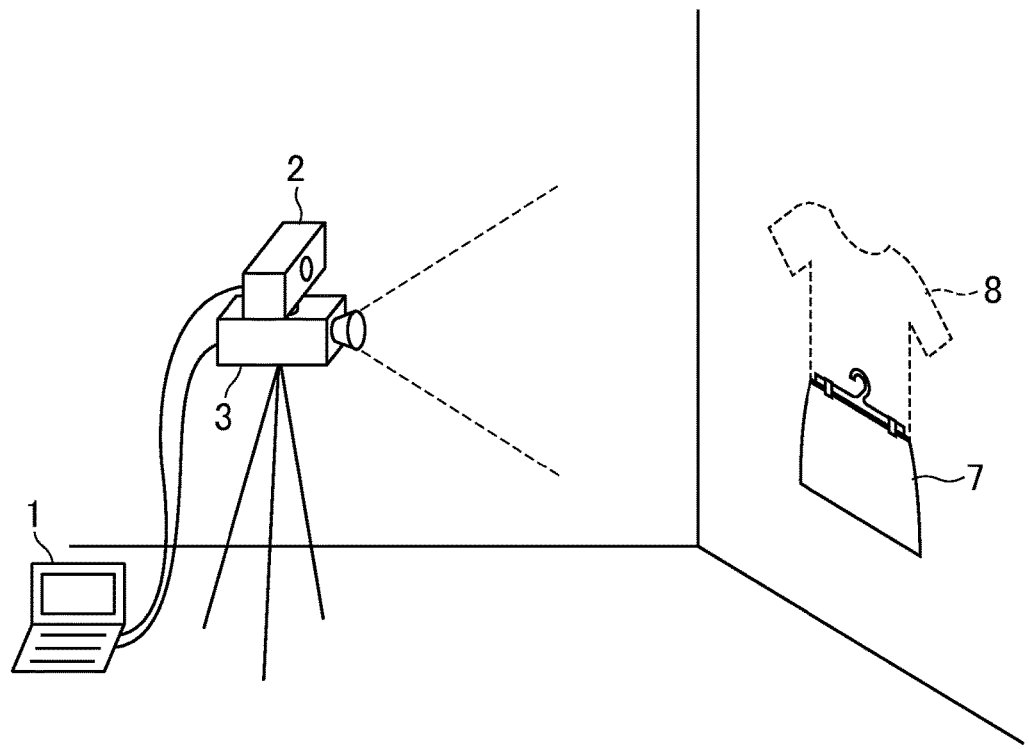
FIG. 2 is a diagram illustrating an example of the arrangement of a camera, a projector, a photographing subject, and a projected image.

FIG. 2 is a diagram illustrating an example of the arrangement of the camera 2, the projector 3, a photographing subject, and a projected image. In FIG. 2, bottom wear 7 that is an actual piece of clothing, for example, clothing that the user owns, is hanging on a hanger on a wall. The bottom wear 7 is the photographing subject of the camera 2, and the wall is a projection surface on which the projector 3 projects an image. The camera 2 has a unit that radiates infrared light to acquire the depth image, and the longitudinal direction of the camera 2 is orthogonal to the direction of photographing. The depth image and the visible image that are acquired by the camera 2 are sent to the user client 1. The projector 3 projects on the wall a top wear image 8 as an image of top wear, which is a type of clothing. The top wear image 8 is adjusted in position and size depending on the position of the photographing subject, the distance to the projection surface, and the like. The photographing subject photographed by the camera 2 is within a spatial range in which the projector 3 projects an image. In other words, when viewed from the projector 3, the photographing subject is placed in a direction in which the projector 3 projects an image (a projection direction).

Figure 3:
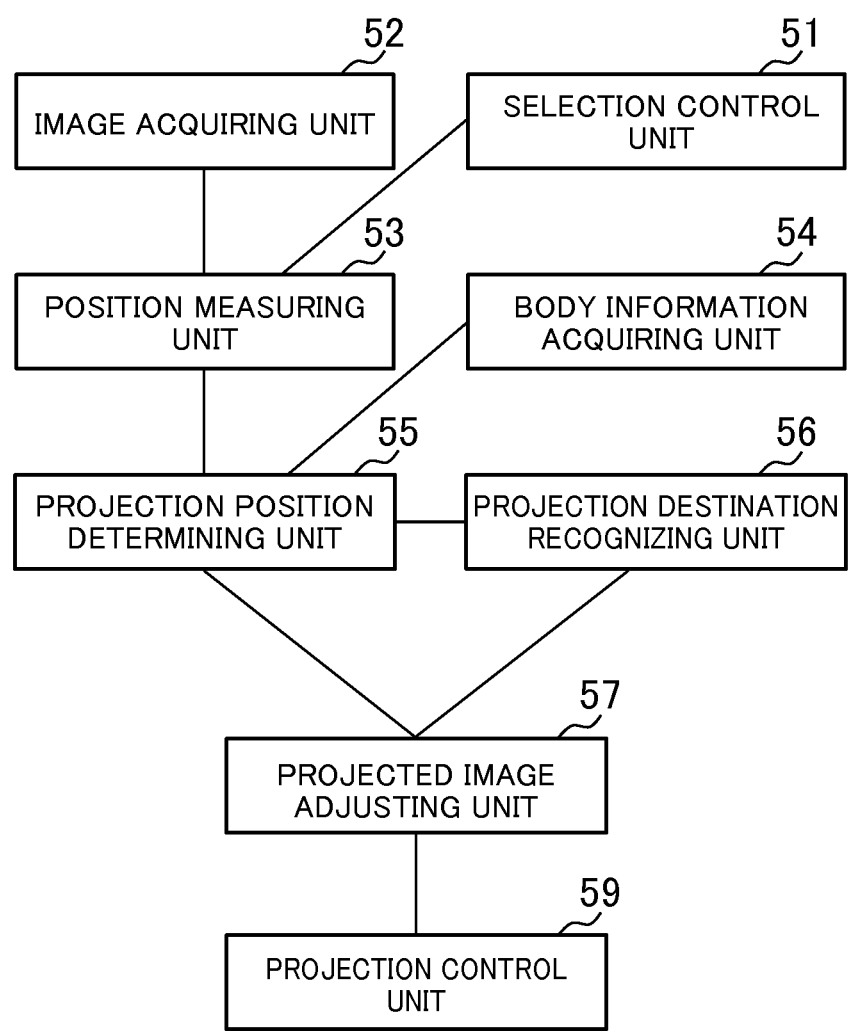
FIG. 3 is a functional block diagram illustrating functions that are implemented by a user client.

FIG. 3 is a functional block diagram illustrating functions that are implemented by the user client 1. The user client 1 includes, in terms of function, a selection control unit 51, an image acquiring unit 52, a position measuring unit 53, a body information acquiring unit 54, a projection position determining unit 55, a projection destination recognizing unit 56, a projected image adjusting unit 57, and a projection control unit 58. Those functions are implemented by the processor 11 by executing programs that are stored in the storage 12 and controlling the communication unit 13 and other components. The image acquiring unit 52, the position measuring unit 53, the projection position determining unit 54, the projection destination recognizing unit 56, the projected image adjusting unit 57, the projection control unit 58, and the body information acquiring unit 54 correspond to image acquiring means, measuring means, position determining means, projection destination recognizing means, image adjusting means, projection control means, and body information acquiring means, respectively, in the claims.

Figure 4:
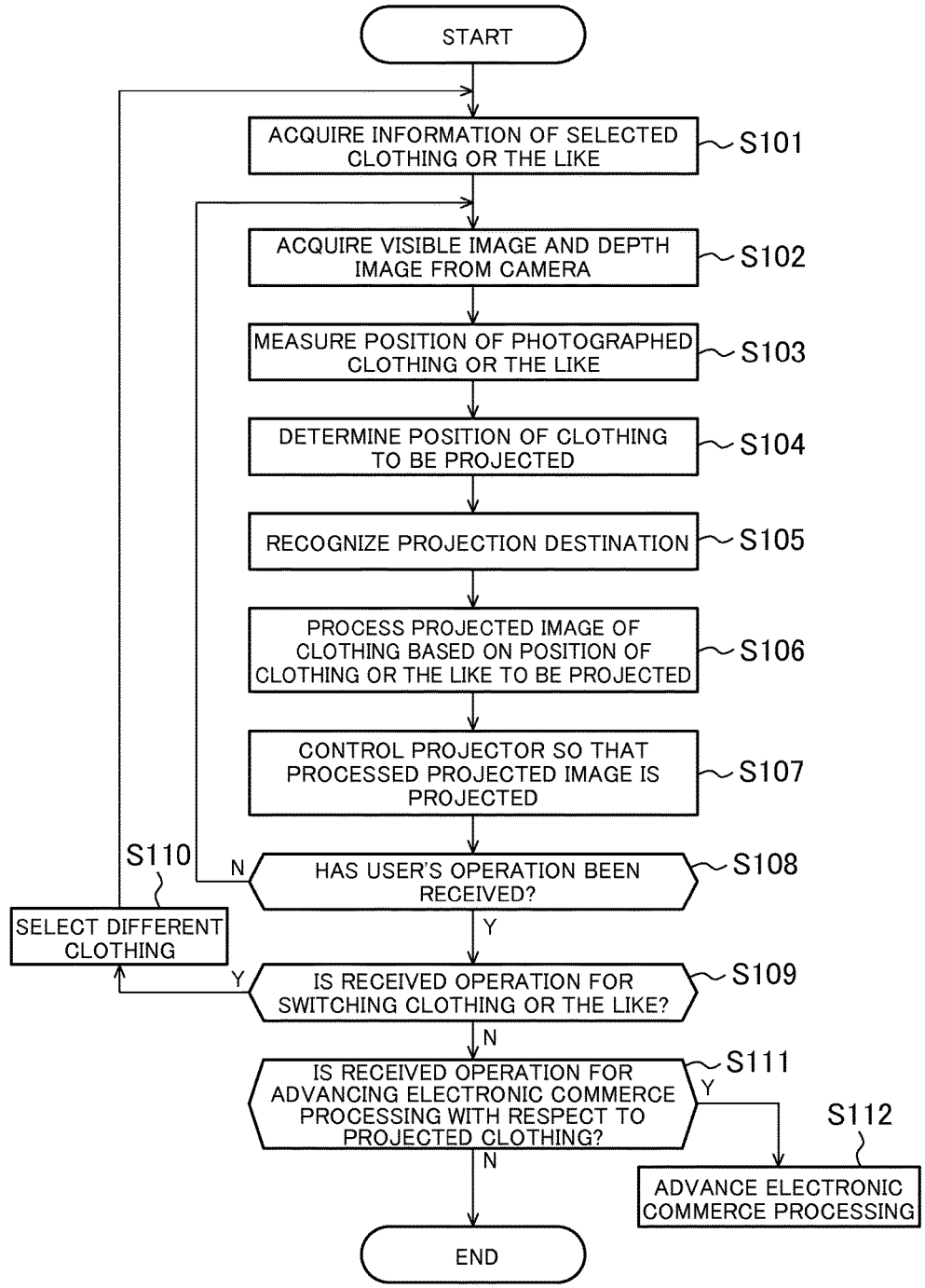
FIG. 4 is a diagram illustrating an example of a processing flow of the user client.

The functions implemented by the user client 1 are described below with reference to processing flow charts and other diagrams. FIG. 4 is a diagram illustrating a schematic processing flow of the selection control unit 51.

The selection control unit 51 is implemented mainly by the processor 11, the storage 12, and the communication unit 13. The selection control unit 51 acquires, from the virtual shopping mall server 4, information of a piece of clothing or the like that is selected by the user as a subject whose image is to be projected (Step S101).

Figure 5:
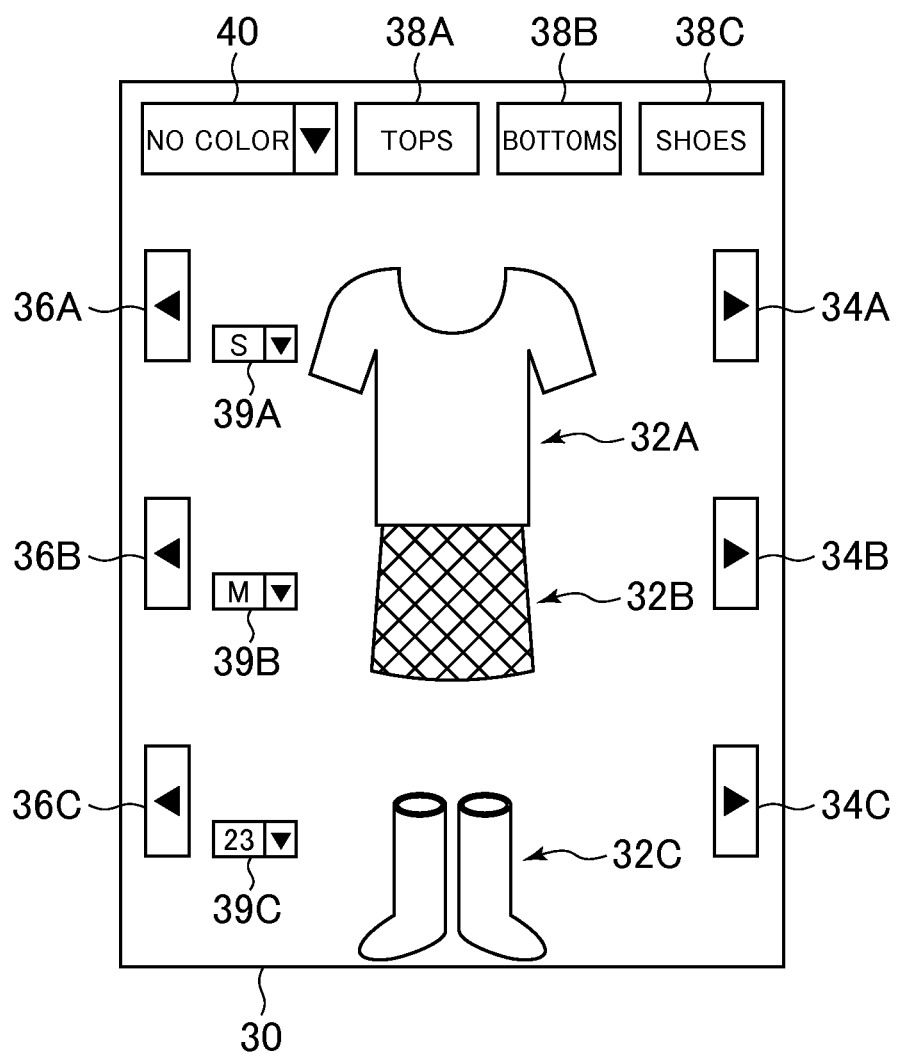
FIG. 5 is a diagram illustrating an example of a coordinate screen.

FIG. 5 is a diagram illustrating an example of a coordinate screen 30. The selection control unit 51 exerts control so that the coordinate screen 30 is output to a display panel or a similar device connected to the user client 1. The virtual shopping mall server 4 transmits, to the user client 1, data for displaying the coordinate screen 30 on the user client 1 in response to the user's operation such as inputting a search criterion.

As illustrated in FIG. 5, the coordinate screen 30 displays a combination of a top wear image 32A, a bottom wear image 32B, and a shoes image 32C. The top wear image 32A is an image of top wear (clothing to be worn on the upper body) that is selected from among pieces of top wear sold in the virtual shopping mall. Similarly, the bottom wear image 32B is an image of bottom wear (clothing to be worn on the lower body) that is selected from among pieces of bottom wear sold in the virtual shopping mall, and the shoes image 32C is an image of a pair of shoes that is selected from among pairs of shoes sold in the virtual shopping mall. Here, a subject whose image is to be projected is selected from the top wear sales item, the bottom wear sales item, or other sales items whose images are displayed.

The coordinate screen 30 also displays forward buttons 34A, 34B, and 34C and back buttons 36A, 36B, and 36C. The user presses those buttons to switch the top wear image 32A, the bottom wear image 32B, and the shoes image 32C that are displayed on the coordinate screen 30 and selected as the subjects whose images are to be projected.

The coordinate screen 30 is designed so as to display a plurality of top wear images 32A in a given order. The forward button 34A and the back button 36A are buttons for switching the top wear image 32A that is displayed on the coordinate screen 30. With the press of the forward button 34A, the next top wear image 32A is displayed on the coordinate screen 30. The press of the back button 36A, on the other hand, causes the coordinate screen 30 to display the preceding top wear image 32A.

Similarly, the coordinate screen 30 is designed so as to display a plurality of bottom wear images 32B in a given order. The forward button 34B and the back button 36B are buttons for switching the bottom wear image 32B that is displayed on the coordinate screen 30. With the press of the forward button 34B, the next bottom wear image 32B is displayed on the coordinate screen 30. The press of the back button 36B, on the other hand, causes the coordinate screen 30 to display the preceding bottom wear image 32B.

The coordinate screen 30 is further designed so as to display a plurality of shoes images 32C in a given order. The forward button 34C and the back button 36C are buttons for switching the shoes image 32C that is displayed on the coordinate screen 30. With the press of the forward button 34C, the next shoes image 32C is displayed on the coordinate screen 30. The press of the back button 36C, on the other hand, causes the coordinate screen 30 to display the preceding shoes image 32C.

The coordinate screen 30 also displays a tops button 38A, a bottoms button 38B, and a shoes button 38C. When one of those buttons are pressed, one of the top wear image 32A and the others that corresponds to the pressed button is switched automatically in a given order for every given length of time (for example, for every two seconds) as an image displayed on the coordinate screen 30 to be selected. When the same button out of the tops button 38A and the others is pressed again, the automatic switching of one of the top wear image 32A and the others that corresponds to the pressed button is stopped.

The coordinate screen 30 also displays size selection fields 39A to 39C. The size selection fields 39A to 39C each allow the user to select one of the clothing sizes of the currently displayed sales item. The size selection fields 39A to 39C are also used to determine the size of clothing or the like that is selected as a subject whose image is to be projected. The size options may vary from one piece of clothing, or other types of sales items, to another, and what size options a piece of clothing or the like has is registered, for each sales item, in sales item information in the sales item information (item information) database that is included in the virtual shopping mall server 4.

For example, in the case where "S", "M", and "L" are set as sizes in the sales item information, the selection control unit 51 acquires "S", "M", and "L" and displays those sizes as options in the relevant size selection field. In the case where "size 7", "size 9", and "size 11" are set in the sales item information, the selection control unit 51 acquires and displays "size 7", "size 9", and "size 11". Each size option is associated with an actually measured value that indicates the relation between the actual item and the item's image, and the selection control unit 51 displays the item's image on the coordinate screen 30 after enlarging or reducing the item's image based on the actually measured value. In the screen image of FIG. 5, the shoulder position of a size of a virtual model is known, which determines a scale indicating how many dots equals one meter in the screen. The selection control unit 51 therefore uses an actually measured value that is associated with a size option of the item such as "S", "M", or "L" to enlarge or reduce the item's image and display the item's image in an appropriate size (scale).

The coordinate screen 30 also displays a background field 40. The background field 40 is for selecting a background of the coordinate screen 30.

The selection control unit 51 acquires from the virtual shopping mall server 4 information of clothing such as top wear, bottom wear, or shoes, or other types of items, selected in the manner described above. FIG. 6 shows an example of sales item information that is transmitted from the virtual shopping mall server 4 and is acquired by the selection control unit 51. FIG. 7 shows an example of size image information that is transmitted from the virtual shopping mall server 4 and is acquired by the selection control unit 51. The sales item information and the size image information are information about selected clothing or the like, and are information read out of the sales item information database by the virtual shopping mall server 4 and transmitted by the virtual shopping mall server 4.

Information items included in the sales item information are store ID, sales item ID, sales item name, category, and sub-category. The store ID is the store ID of a virtual store that sells a piece of clothing or the like in question as a sales item. The category is information that indicates the type of the sales item, such as whether the sales item is top wear, bottom wear, or shoes. The sub-category is information that indicates a more finely classified type of the sales item such as "T-shirt" under "tops".

Information items included in the size image information are, in addition to store ID and sales item ID, size classification, image ID, particular line width, right and left edge positions of particular line, chest width, waist, hip, upper arm circumference, and length. The particular line is a line that runs across a particular portion on a piece of clothing or the like in the lateral direction and that is used to determine the position of the clothing. The particular line width indicates an actually measured value of the left-to-right width of the particular line. Specifically, the particular line width is the shoulder width in the case of top wear, and the hip width in the case of bottom wear. The right and left edge positions of particular line are information of coordinates at right and left edges of a portion of an image (an image indicated by the image ID) of a sales item having the size, the portion of the image corresponds to the particular line. In other words, the right and left edge positions indicate where, in the image, the particular line is placed. The right and left edge positions of the particular line that are held as data here may instead be acquired from the image by the user client 1. A processing flow thereof is a modification of a processing flow of FIG. 8 described later in which a sales item image is used instead of a photographed image. The scale of an image of a sales item to the actual sales item can be figured out from a distance in the image, which is acquired from the particular line right and left edge positions, and from the particular line width. The chest width information, the waist information, the hip information, the upper arm circumference information, and the length information are pieces of information that indicate finer measurements of the clothing. In the case where clothing or the like in question is a T-shirt, the chest width information, the waist information, and the length information are included. In the case of one-piece, for example, information is included in all of those information items. How those pieces of information are used is described later.

The image acquiring unit 52 is implemented mainly by the processor 11, the storage 12, and the input/output unit 14. When information about selected clothing or the like is acquired, the image acquiring unit 52 acquires, from the camera 2, a photographed image (the visible image and the depth image) of clothing or the like (an item) placed near the projection surface (Step S102). In the case where the type of this item is top wear, the item is worn on the upper body. In the case where the type of this item is bottom wear, the item is worn on the lower body. In the case where the type of this item is shoes, the item is worn on feet. This item corresponds to a first item in the claims, and the upper body, the lower body, or feet on which this item is to be worn corresponds to a first part in the claims. The image of clothing or the like that is acquired in this step may be an image of clothing hanging on a hanger or the like, or may be an image of clothing being worn on a person.

The position measuring unit 53 is implemented mainly by the processor 11 and the storage 12. The position measuring unit 53 measures the position of clothing or the like based on an image acquired by the image acquiring unit 52, by measuring the position of the particular line that is a specific portion associated with the category of the clothing or the like in the image (Step S103). The processing of the position measuring unit 53 is described in more detail below.

Figure 8:
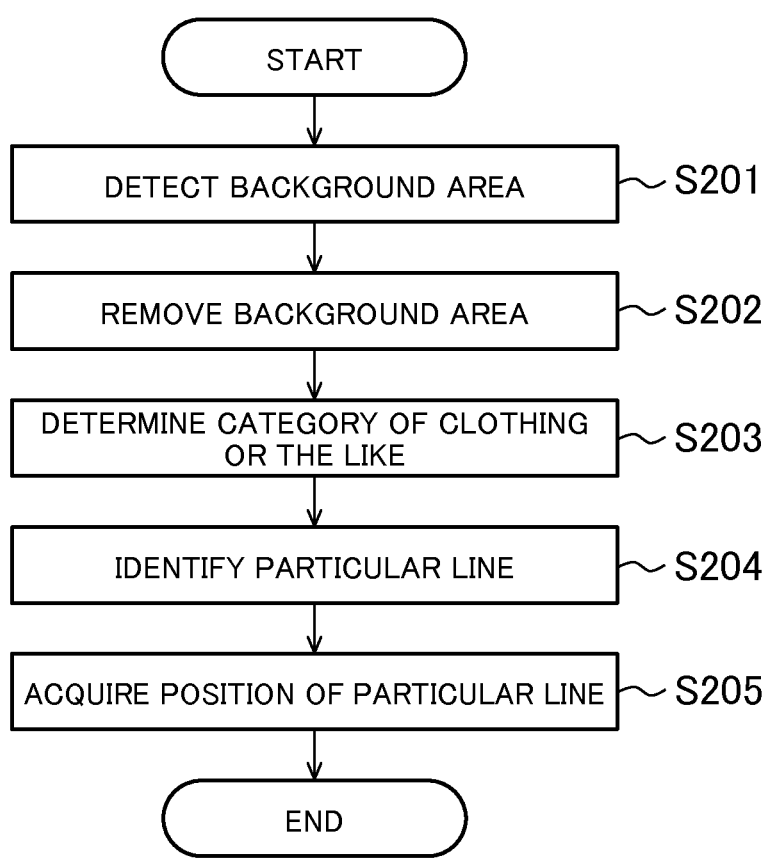
FIG. 8 is a diagram illustrating an example of a processing flow of a position measuring unit.

FIG. 8 is a diagram illustrating an example of a processing flow of the position measuring unit 53. First, the position measuring unit 53 detects a background area from a photographed image (Step S201). The term "background area" means an area that is not an area taken up by the photographed piece of clothing (a clothing area).

Figure 9A:
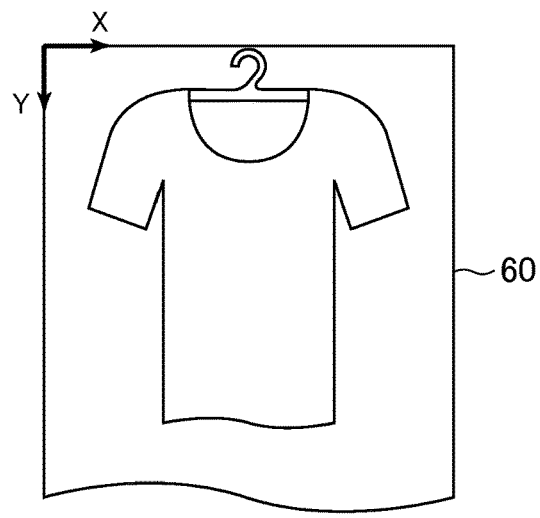
FIG. 9A is a diagram illustrating an example of a background area detecting method.
Figure 9B:
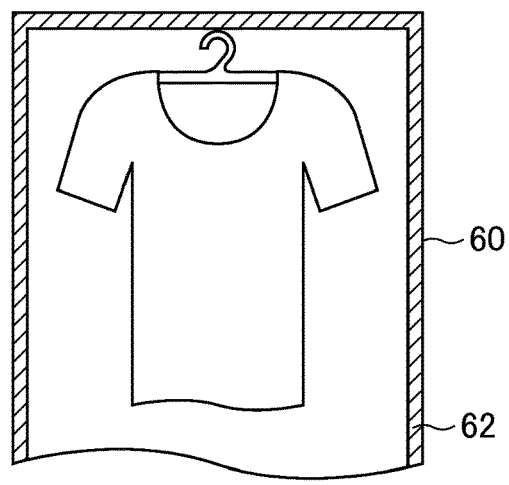
FIG. 9B is a diagram illustrating the example of the background area detecting method.
Figure 9C:
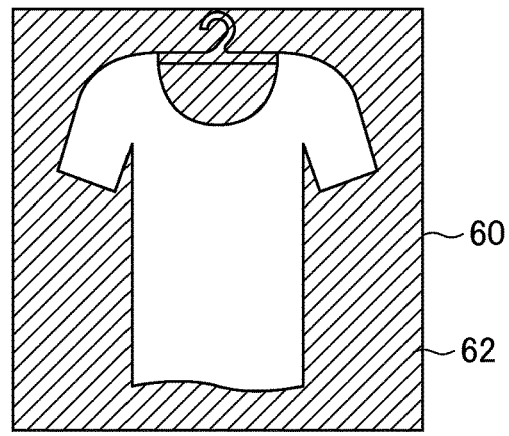
FIG. 9C is a diagram illustrating the example of the background area detecting method.

FIG. 9A, FIG. 9B, and FIG. 9C are diagrams illustrating an example of how a background area is detected. FIG. 9A illustrates an example of a visible image to be processed by background area detecting processing. The visible image 60 of FIG. 9A is a photographed image of top wear that is hanging on a wall or the like with use of a hanger. In the visible image 60, the background has a solid color or colors similar to one another. In the visible image 60 of FIG. 9A, the color of the clothing area is not the same as or similar to the colors of other areas than the clothing area.

To detect a background area in the visible image 60, the position measuring unit 53 first sets initial settings in which pixel lines (pixel rows and pixel columns) adjacent to the four sides of the clothing image 60 form a background area 62 as illustrated in FIG. 9B.

Thereafter, the position measuring unit 53 determines whether or not an adjacent pixel that is adjacent to a pixel in the background area 62 has a color that is the same as or similar to the color of the pixel in the background area 62. An "adjacent pixel" is a pixel that is adjacent to a pixel in the background area 62 and that is not included in the background area 62.

For instance, the position measuring unit 53 determines whether or not the degree of similarity between the color of the pixel in the background area 62 and the color of the adjacent pixel is higher than a reference similarity. The position measuring unit 53 determines that the adjacent pixel has a color that is the same as or similar to the color of the pixel in the background area 62 when the degree of similarity is higher than the reference similarity.

More specifically, the position measuring unit 53 calculates the Euclidean distance between the color value (for example, RGB value) of the pixel in the background area 62 and the color value (for example, RGB value) of the adjacent pixel. The position measuring unit 53 determines whether or not the calculated Euclidean distance is smaller than a reference value. When the Euclidean distance is smaller than the reference value, the position measuring unit 53 determines that the adjacent pixel has a color that is the same as or similar to the color of the pixel in the background area 62.

Color may be expressed by other color values than the RGB value. For instance, a color value in the CIELAB color space or the HSV color space is used in some cases. The method of determining whether or not two colors are the same as or similar to each other is not limited to the one that uses the Euclidean distance. For instance, the mean square error, the Mahalanobis distance, or the Earth Mover's Distance may be used to determine whether or not two colors are the same as or similar to each other.

When it is determined that the adjacent pixel has a color that is the same as or similar to the color of the pixel in the background area 62, the position measuring unit 53 adds this adjacent pixel to the background area 62. The position measuring unit 53 expands the background area 62 in this manner.

The processing described above is executed repeatedly until no more adjacent pixel is found that is the same as or similar to a pixel in the background area 62 in color. The background area 62 as the one illustrated in FIG. 9C is detected as a result.

After executing Step S201, the position measuring unit 53 removes the background area 62 in the visible image 60 (S202). The position measuring unit 53 sets settings that make the background area 62 in the visible image 60 transparent.

The background area may be detected by a different method. For instance, the position measuring unit 53 may use the visible image of the background that is photographed in advance to detect, as the background area, an area where a differential in luminance from the condition of photographing of the clothing or the like is smaller than a given value.

The depth image may be used to detect and remove the background area. Utilizing the fact that the clothing is in front of the background, a threshold for identifying the background based on, for example, a difference in distance between adjacent pixels in the depth image is acquired, and components behind the threshold are removed as the background.

After Step S202 is executed, the position measuring unit 53 determines the category of the photographed clothing (Step S203). This category is, for example, one of "tops", "bottoms", and "shoes", which respectively correspond to parts of human body (upper body, lower body, and feet) on which pieces of clothing or the like belonging to the respective categories are to be worn. The position measuring unit 53 can execute this determination by an image recognition technology that uses a machine learning technology such as the support vector machine. Instead of determining automatically in this manner, the position measuring unit 53 may acquire information about the category of photographed clothing that is input by the user to the coordinate screen 30. In the case where settings for checking how well a piece of clothing that is not on hand coordinates with an actual piece of clothing are set, the position measuring unit 53 may be controlled so that clothing or the like that belongs to a category determined in this step is automatically excluded as a subject whose image is to be projected in the subsequent steps.

The position measuring unit 53 next determines the particular line (S204). The particular line is a line running in the lateral direction through portions that correspond to the shoulders in the case of top wear, and portions that correspond to the hips in the case of bottom wear. The particular line is determined depending on the category to which a piece of clothing or the like in question belongs. The position of the particular line is determined so that the particular lines of pieces of clothing or the like that belong to the same category are aligned substantially at the same position when the pieces of clothing or the like are worn.

Figure 10:
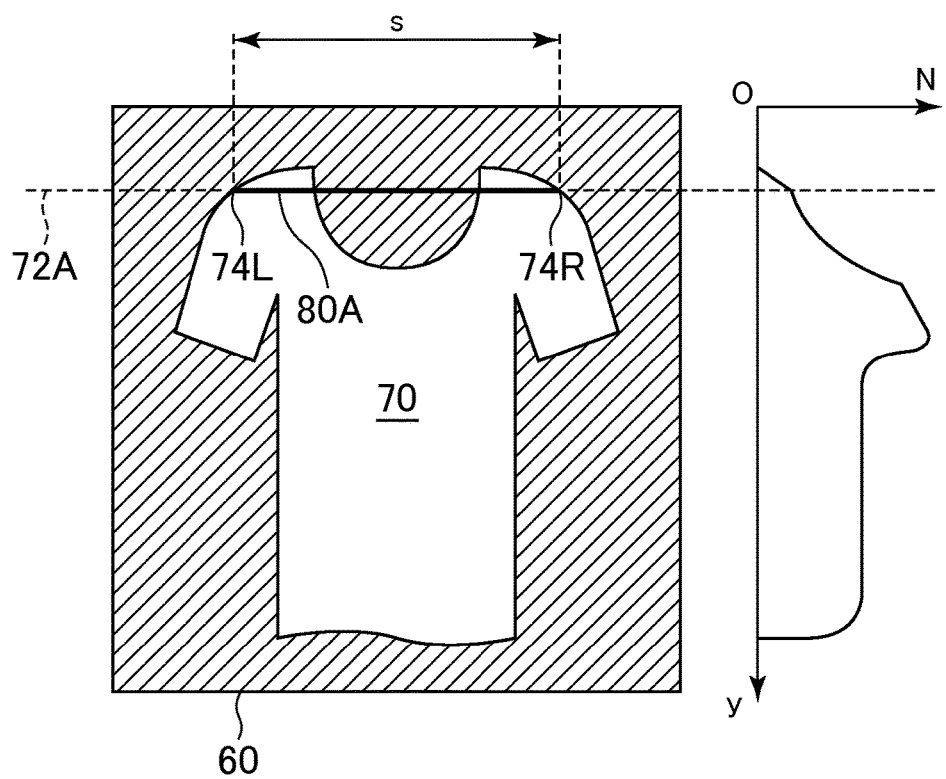
FIG. 10 is a diagram illustrating an example of a method of identifying a particular line in a photographed image of top wear.

FIG. 10 is a diagram illustrating an example of a method of identifying a particular line in a photographed image of top wear. When the visible image 60 is a top wear image, a particular line 80A is acquired by detecting a shoulder line 72A.

More specifically, the position measuring unit 53 first converts the visible image 60 into a binary image. FIG. 10 illustrates the visible image 60 that has been converted into a binary image. Next, for each pixel row in the visible image 60 (namely, each pixel line that stretches in a direction corresponding to the lateral direction of the piece of clothing), the position measuring unit 53 counts the number of pixels that are included in a clothing area 70 (a count (N)). A graph in FIG. 10 shows a histogram of the counts (N) of the respective pixel rows.

The shoulder line 72A is detected by examining the slope of the histogram because the curvature tends to be large in the shoulder part in the case of a top wear image. Specifically, the position measuring unit 53 examines changes in a curvature θ(y) of the histogram from the top of the visible image 60 in order.

Changes in the curvature θ(y) are calculated through the calculation of an inner product by the following Expression (1) based on the histogram described above, which is denoted by hist(y). For example, when the vertical sides and lateral sides of the visible image 60 are both 400 pixels in length, a height h is set to 5 pixels when the curvature θ(y) is obtained.

[Math. 1]

$$\begin{cases} \vec{A} = (hist(y-h), -h) \\ \vec{B} = (hist(y+h), h) \\ \theta(y) = \dfrac{\cos^{-1}(\vec{A} \cdot \vec{B})}{|\vec{A}||\vec{B}|} \end{cases} \quad (1)$$

The position measuring unit 53 examines the curvature θ(y) from the top of the visible image 60 in order, and detects a point where a change in the curvature θ(y) exceeds a given value (e.g., 180°) for the first time as the shoulder position. In other words, the position measuring unit 53 detects as the shoulder line 72A a pixel row where a change in the curvature θ(y) exceeds a given value (e.g., 180°) for the first time.

The position measuring unit 53 then acquires, as the particular line 80A, a part of the pixel row detected as the shoulder line 72A that runs from a left edge 74L of the clothing area 70 to a right edge 74R of the clothing area 70.

Figure 11:
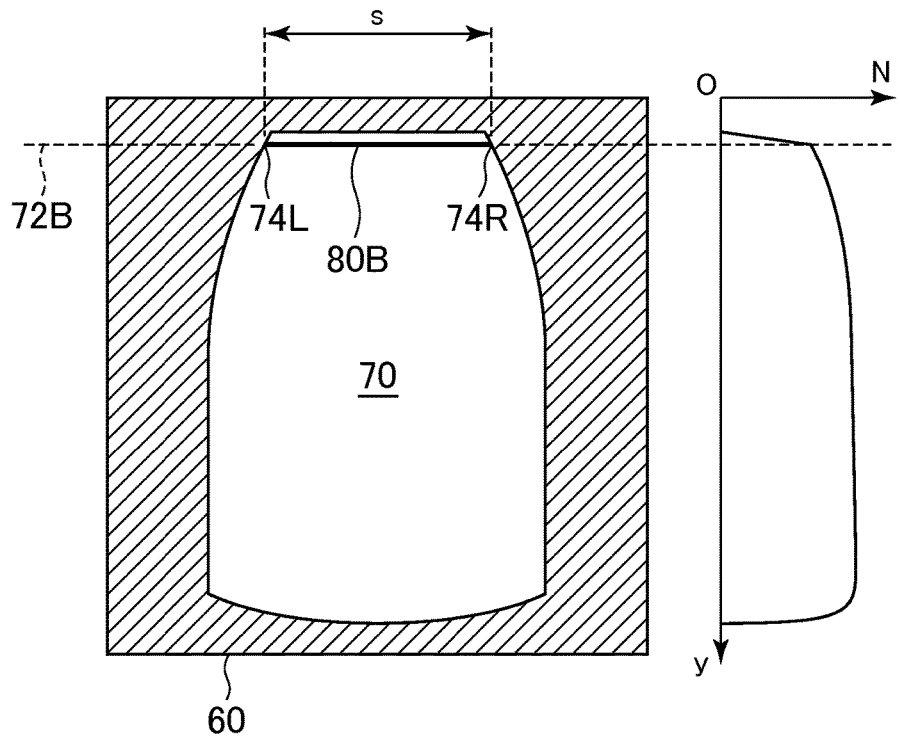
FIG. 11 is a diagram illustrating an example of a method of identifying a particular line in a photographed image of bottom wear.

FIG. 11 is a diagram illustrating an example of a method of identifying a particular line in a photographed image of bottom wear. When the visible image 60 is a bottom wear image, a particular line 80B is acquired by detecting a hip line 72B.

The position measuring unit 53 first converts the visible image 60 into a binary image. Similarly to FIG. 10, FIG. 11 illustrates the visible image 60 that has been converted into a binary image.

Thereafter, for each pixel row in the visible image 60 (namely, each pixel line that stretches in a direction corresponding to the lateral direction of the piece of clothing), the position measuring unit 53 counts the number of pixels that are included in a clothing area 70 (a count (N)). A graph in FIG. 9 shows a histogram of the counts (N) of the respective pixel rows.

Similarly to the top wear image, the hip line 72B is detected by examining the slope of the histogram because the curvature tends to be large in the hip part in the case of a bottom wear image. Specifically, the position measuring unit 53 examines changes in a curvature θ(y) of the histogram from the top of the visible image 60 in order. Changes in the curvature θ(y) are calculated through the calculation of an inner product by the above-mentioned Expression (1) based on the histogram described above, which is denoted by hist(y).

The position measuring unit 53 examines the curvature θ(y) from the top of the visible image 60 in order, and detects a point where a change in the curvature θ(y) exceeds a given value (e.g., 180°) for the first time as the hip position. In other words, the position measuring unit 53 detects as the hip line 72B a pixel row where a change in the curvature θ(y) exceeds a given value (e.g., 180° for the first time.

The position measuring unit 53 then acquires, as the particular line 80B, a part of the pixel row detected as the hip line 72B that runs from a left edge 74L of the clothing area 70 to a right edge 74R of the clothing area 70. In the following description, the particular lines 80A and 80B may collectively be referred to as "particular line 80".

The position measuring unit 53 next acquires the position of the particular line 80 (Step S205). The position of the particular line 80 is the three-dimensional position of the midpoint of the particular line 80, and is acquired based on the position of the midpoint of the particular line 80 in the image and on the distance of the particular line 80 from the camera 2, which is acquired from the depth image. The position of the particular line 80 may be expressed with the position in the image and the distance that are described above, or may be expressed in the form of three-dimensional coordinates in a coordinate system that is determined by the position and direction of the camera 2. The tilt of the particular line 80 in the top-bottom direction or the forward-backward direction, which is not detected here, may be detected.

The method described above can be used to acquire the position of the particular line 80 also when the photographed image is of the user wearing clothing. The position measuring unit 53 in this case may use human body bone structure information acquired from the depth image to acquire the position of the particular line 80. For example, human body bone structure information of the user, namely, the positions of the user's shoulders and hips can be acquired easily by using a program library, which is provided for a depth image sensor such as Kinect (trademark), and the particular line 80 is acquired from this information. This method is particularly effective in the detection of the particular line 80 that corresponds to hips.

The body information acquiring unit 54 and the projection position determining unit 55 are implemented mainly by the processor 11 and the storage 12. After the position of the photographed clothing or the like is measured, the projection position determining unit 55 determines the position of an item that is selected by the selection control unit 51 to be projected, based on the position of the particular line 80 and on the positional relation between a particular line that is a specific portion of the selected item to be projected and the particular line 80 (e.g., relative positions in a space) (Step S104). The item to be projected corresponds to a second item in the claims. A part on which the projected item is to be worn (one of upper body, lower body, and feet) corresponds to a second part in the claims. Human body model information, which is acquired by the body information acquiring unit 54, is also used in the determination of the position of the clothing. This step is described in more detail below.

Figure 12:
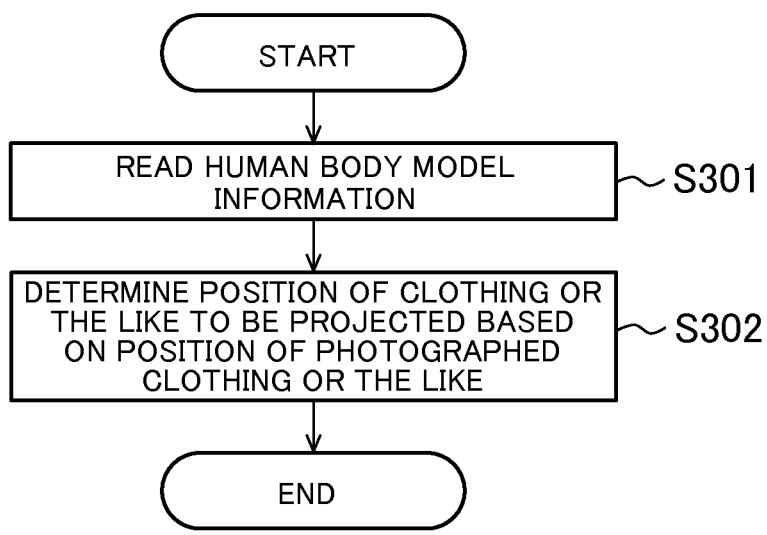
FIG. 12 is a diagram illustrating an example of a processing flow of a body information acquiring unit and a projection position determining unit.
Figure 13:
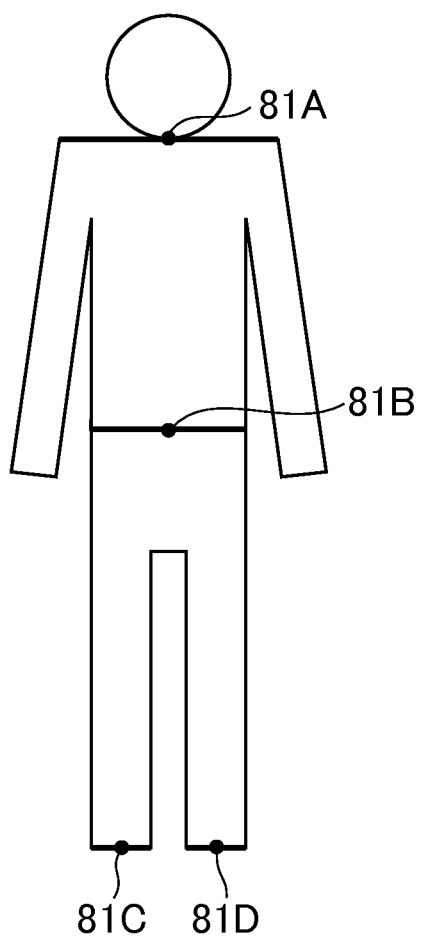
FIG. 13 is a diagram illustrating an example of a human body model.

FIG. 12 is a diagram illustrating an example of a processing flow of the body information acquiring unit 54 and the projection position determining unit 55. First, the body information acquiring unit 54 reads human body model information stored in the storage 12 in advance (Step S301). The human body model information is information representing a human body model that is the modeled body of the user who performs the operation of checking clothing coordinates. FIG. 13 is a diagram illustrating an example of the human body model. Points on the human body model that serve as parameters include a shoulder point 81A, which is the midpoint of a line corresponding to the shoulders of the human body, a hip point 81B, which is the midpoint of a line corresponding to the hips of the human body, a right foot point 81C, which is the midpoint of a line corresponding to the tip of the right foot of the human body, and a left foot point 81D, which is the midpoint of a line corresponding to the tip of the left foot of the human body. The human body model information includes the coordinates of those points, which are acquired by measuring the user's body in advance. The human body model information may additionally include information of the user's waist size, bust size, hip size, and the like.

After the human body model information is read, the projection position determining unit 55 determines the position of clothing or the like to be projected, based on the human body model information and the position of the photographed clothing or the like (Step S302). For example, the position of the particular line 80A in top wear corresponds to the shoulder point 81A, and the position of the particular line 80B in bottom wear corresponds to the hip point 81B, which means that the position of the particular line 80 and the position of the relevant point on the human body model are the same or can be converted into each other through simple offset. When, for example, the position of the particular line 80A in top wear is the same as that of the shoulder point 81A and the position of the hip point 81B is the same as the position of bottom wear (e.g., the position of the particular line 80B), the position of the midpoint of the particular line in the bottom wear image can be acquired by adding, to the position of the particular line 80A in top wear, the relative position of the hip point 81B with respect to the shoulder point 81A. The acquired position can be the position in the projected image. In this case, the position of the clothing or the like to be projected in the image can be acquired by adding, to the coordinates of the particular line 80 in the photographed image of clothing or the like, a value obtained by multiplying the above-mentioned relative position value by magnification that depends on the distance of the particular line 80 from the camera 2. The projection position determining unit 55 thus determines the position of an item to be projected in the case where an item photographed by the camera 2 is worn by a human body that corresponds to the human body model information. The enlargement/reduction ratio of the image is calculated from the distance to a projection target, which is obtained by a method described later.

An image of a human body wearing clothing may be photographed so that an image is projected on the human body. In this case, the human body model information is not necessarily used, and the particular line of the photographed clothing or the like can be used without modifications as the position of clothing or the like to be projected. In other words, instead of the human body model, the projection position determining unit 55 uses the particular line of clothing or the like that belongs to a projection subject category, which is detected by the position measuring unit 53 from the human body bone structure or from the worn clothing. The projection position determining unit 55 simply determines this particular line position as the position of the clothing or the like to be projected.

The projection destination recognizing unit 56 is implemented mainly by the processor 11 and the storage 12. The projection destination recognizing unit 56 recognizes a projection destination (projection target) placed in a projection area of the projector (Step S105). The projection destination recognized here is a projection surface such as a wall. More specifically, the projection destination recognizing unit 56 acquires, from the depth image, a distance at the position of the clothing or the like determined by the projection position determining unit 55. The projection destination recognizing unit 56 further acquires the tilt of the projection surface based on the distance of the surroundings thereof, in particular, the distance of an area of the projection surface where an image of the clothing or the like is likely to be projected. A human body may be recognized as a projection destination. In this case, the position and posture of the human body are detected from the depth image or the like, and the shape of the human body that is used in internal calculation is a simplified shape created in advance.

The projected image adjusting unit 57 is implemented mainly by the processor 11 and the storage 12. The projected image adjusting unit 57 processes a projected image of clothing or the like in a manner suited to the position of the projected item, the position of the projection destination, and the like (Step S106). This step is described in more detail below.

Figure 14:
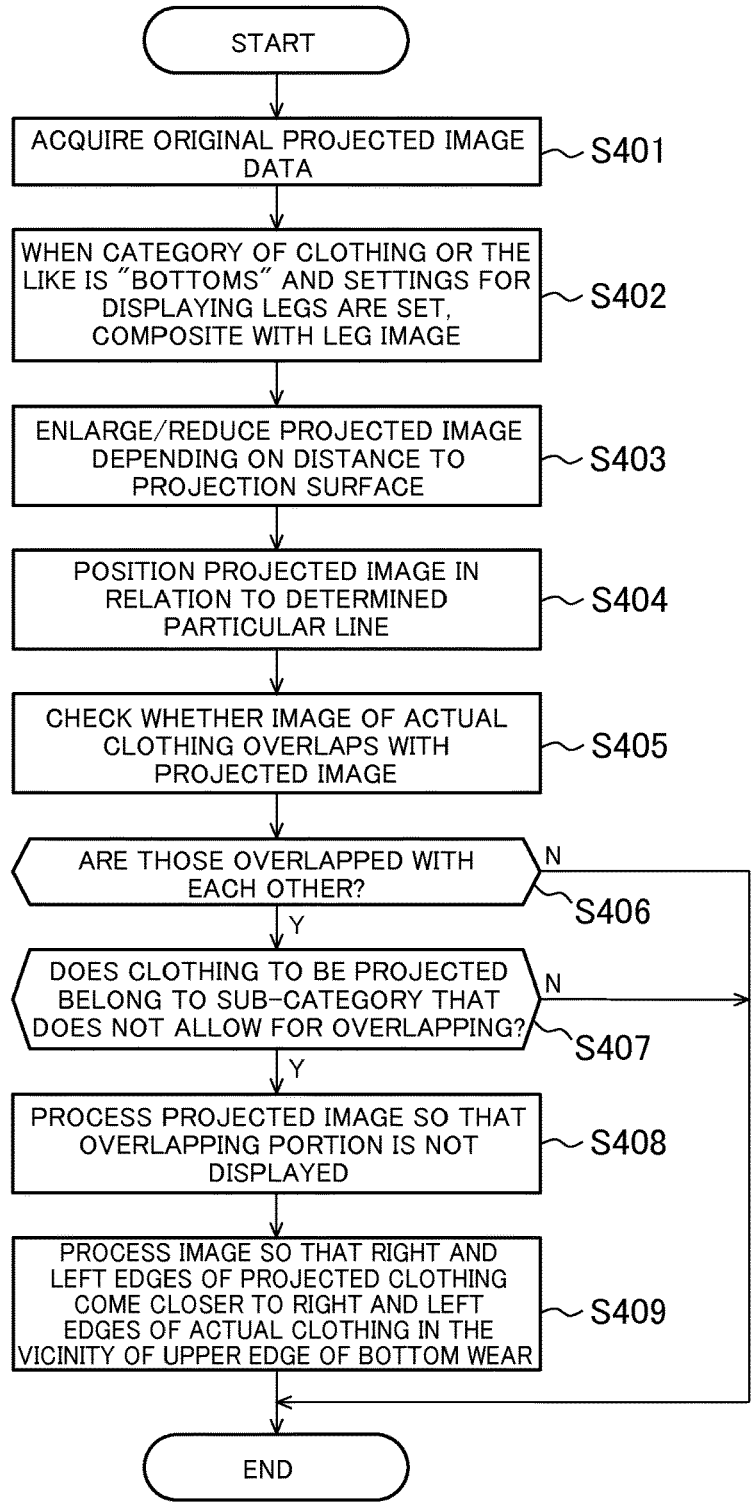
FIG. 14 is a diagram illustrating an example of a processing flow of a projected image adjusting unit.

FIG. 14 is a diagram illustrating an example of a processing flow of the projected image adjusting unit 57. First, the projected image adjusting unit 57 acquires image data of a projected image, which is an original image of an item to be projected (Step S401). This image data has been acquired in Step S101 as a part of the information of the clothing or the like from the virtual shopping mall server 4. In the case where the category of the item to be projected is bottoms and settings for displaying a leg image are set, the projected image adjusting unit 57 next composites the projected image with the leg image (Step S402). More specifically, the projected image adjusting unit 57 performs enlargement/reduction or other types of processing (on the leg image, for example) so that the scale of the projected image and the scale of the leg image match, next aligns the hip positions, and superimposes the bottom wear image and the leg image with the bottom wear image in front. The images are thus adjusted to the length of the skirt or the pants in a manner that indicates how much of the legs show under the bottom wear (for example, below the knees).

Figure 15:
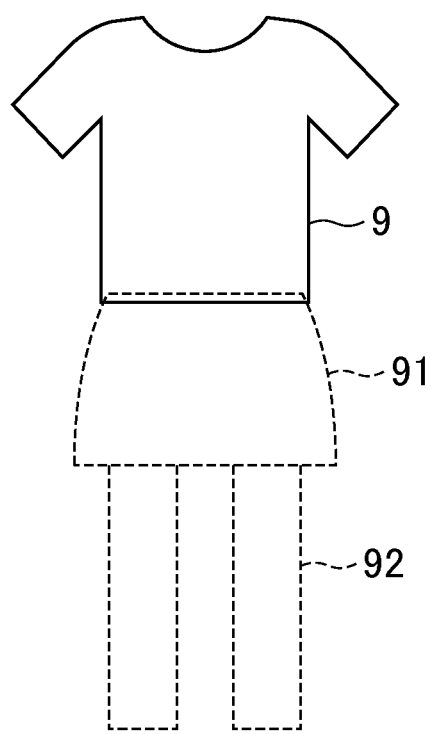
FIG. 15 is a diagram illustrating an example of an image that is displayed when an image of bottom wear is projected.

FIG. 15 is a diagram illustrating an example of an image that is displayed in the case where a bottom wear image is projected. A main reason for the wish to view an image of clothing or the like in actual size is to check the size of the clothing or the like. The user who checks the size of bottom wear by viewing a bottom wear image 91 can have a more concrete idea of how long the bottom wear looks on the user when a leg image 92 is displayed.

The projected image adjusting unit 57 next enlarges/reduces the projected image to suit the projection destination (e.g., the position and tilt of the projection surface) (Step S403). More specifically, the projected image adjusting unit 57 checks how may pixels there are in the lateral width of the clothing or the like to be projected, which is indicated by the size image information, along a distance corresponding to the particular line on the projection surface. The projected image adjusting unit 57 acquires magnification from the ratio of this pixel count and a pixel count corresponding to this lateral width in the projected image, and executes enlargement/reduction at the obtained magnification. The projected image adjusting unit 57 may further perform trapezoidal distortion correction on the projected image depending on the tilt of the projection surface in order to lessen the distortion of the projected image of the clothing or the like.

The projected image adjusting unit 57 next positions the projected image so that the position of the particular line in the enlarged/reduced projected image falls on the particular line position determined by the projection position determining unit 55 (Step S404). The projected image adjusting unit 57 thus generates data of a projected image processed in the manner described above.

As described below, the projected image adjusting unit 57 executes further image processing in which an item image to be projected (projected image) is processed so as to avoid an overlap with an item photographed in front of the camera 2, based on an overlap between the photographed clothing and the projected image. This processing is for expressing that top wear is to be tucked inside bottom wear when a top wear image is projected. The projected image adjusting unit 57 checks whether there is an overlapping area between the actual clothing photographed and the projected image (Step S405). In the case where those have an overlapping area (Y in Step S406) and the sub-category of the projected clothing or the like does not allow for overlapping (Y in Step S407), the projected image adjusting unit 57 further processes the projected image so that the overlapping portion is not displayed (Step S408). One of sub-categories that do not allow for the overlapping is "office-suitable blouses" under "tops". In Step S408, an upper edge of the area where the top wear and the bottom wear overlaps is obtained and the image in an area below the upper edge is deleted.

The projected image adjusting unit 57 next processes the projected image so that, in the vicinity of an upper edge of the bottom wear, right and left edges of the projected clothing (top wear) come closer to right and left edges of the actual clothing (bottom wear) (Step S409). For example, the projected image adjusting unit 57 performs reduction, at a reduction ratio determined for each line separately, on an area of the projected image that is above the upper edge of the bottom wear by a given amount, and moves the image in parallel so that the difference in right and left edge position is reduced. The reduction ratio takes a value that is calculated by dividing the bottom wear width by the top wear width at the upper edge of the bottom wear, and increases toward 1 as the distance from the bottom wear grows and upper lines are approached.

The projection control unit 58 is implemented mainly by the processor 11, the storage 12, and the input/output unit 14. The projection control unit 58 outputs data of a processed projected image to the projector 3, and controls the projector 3 so that the projector 3 projects a projected image (Step S107).

Figure 16:
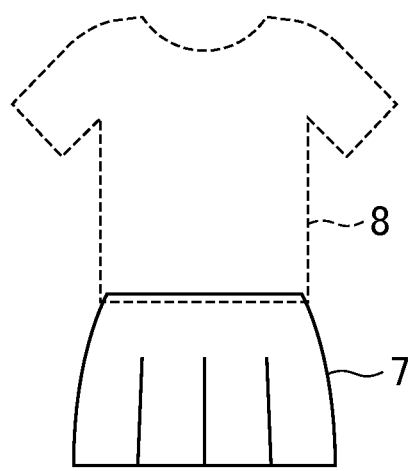
FIG. 16 is a diagram illustrating an example of actual bottom wear and a projected top wear image.

FIG. 16 is a diagram illustrating an example of the actual bottom wear 7 and the projected top wear image 8. The sub-category of this top wear is "T-shirts", which allows for overlapping. The position where the top wear is displayed varies depending on the position of the bottom wear 7. The projected size, which is determined by taking into account the distance to the projection surface, is constant irrespective of the position of the projector 3. The relation between a point corresponding to the shoulders and a point corresponding to the hips in the image is substantially the same as that of the user. Displaying an image of clothing or the like that is adjusted in size and position in this manner enables the user to check clothing coordinates easily.

Figure 17:
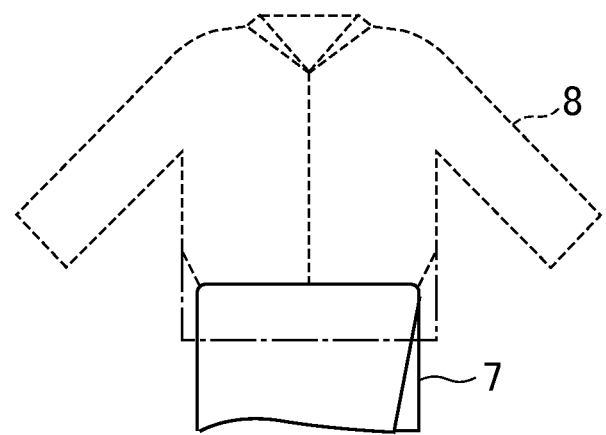
FIG. 17 is a diagram illustrating another example of actual bottom wear and a projected top wear image.

FIG. 17 is a diagram illustrating another example of the actual bottom wear 7 and the projected top wear image 8. In this example, the sub-category of the top wear is one that does not allow for overlapping. The portion indicated by the dot-dash line in FIG. 16 is kept from being displayed by executing Steps S408 and S409 in this case. In addition, unnatural drawing in which the top wear image 8 protrudes in the lateral direction at the upper edge of the bottom wear 7 is also avoided.

The projected image adjusting unit 57 may change the color tone in the image data so that a change in color tone due to the color of the projection destination object is reduced.

Thereafter, the selection control unit 51 checks whether the user's operation has been received (Step S108) and, in the case where the user's operation has not been received (N in Step S108), repeats Step S102 and subsequent steps so as to be ready to follow the photographed clothing if the photographed clothing is moved. On the other hand, in the case where the user's operation has been received (Y in Step S108) and the operation is to switch the clothing or the like that is projected (Y in Step S109), the selection control unit 51 selects another piece of clothing or the like based on whether the operation specifies the next clothing or the like or the preceding clothing or the like (Step S110), and repeats Step S101 and subsequent steps. The user's operation here is not limited to the operation of buttons on a screen as those illustrated in FIG. 5, and may be gesture operation (for example, the operation of swinging an arm to the right or the left) made by body movement of a person who is situated in front of the camera 2. In the case where an image is projected onto a person wearing clothing, for example, this makes it possible to switch the projected clothing or the like without operating the terminal or the like.

In the case where the user's operation is to advance electronic commerce processing with regard to the projected clothing (Y in Step S111), information thereof is selected as the target of the processing and transmitted to the virtual shopping mall server 4, and the electronic commerce processing is allowed to move forward (Step S112). The electronic commerce processing is, for example, purchase processing for going ahead with the purchasing of the currently projected clothing or the like, or processing of adding the currently projected clothing or the like to a favorites list. The favorites list is a list of items that the user is considering to purchase. This operation is also not limited to button operation and can be gesture operation. Different gestures are assigned to different types of operation in advance, for example, the gesture of directing an arm to the upper right to the operation of commencing the purchase processing, and the gesture of directing an arm to the upper left to the operation of adding to the favorites list.

Figure 18:
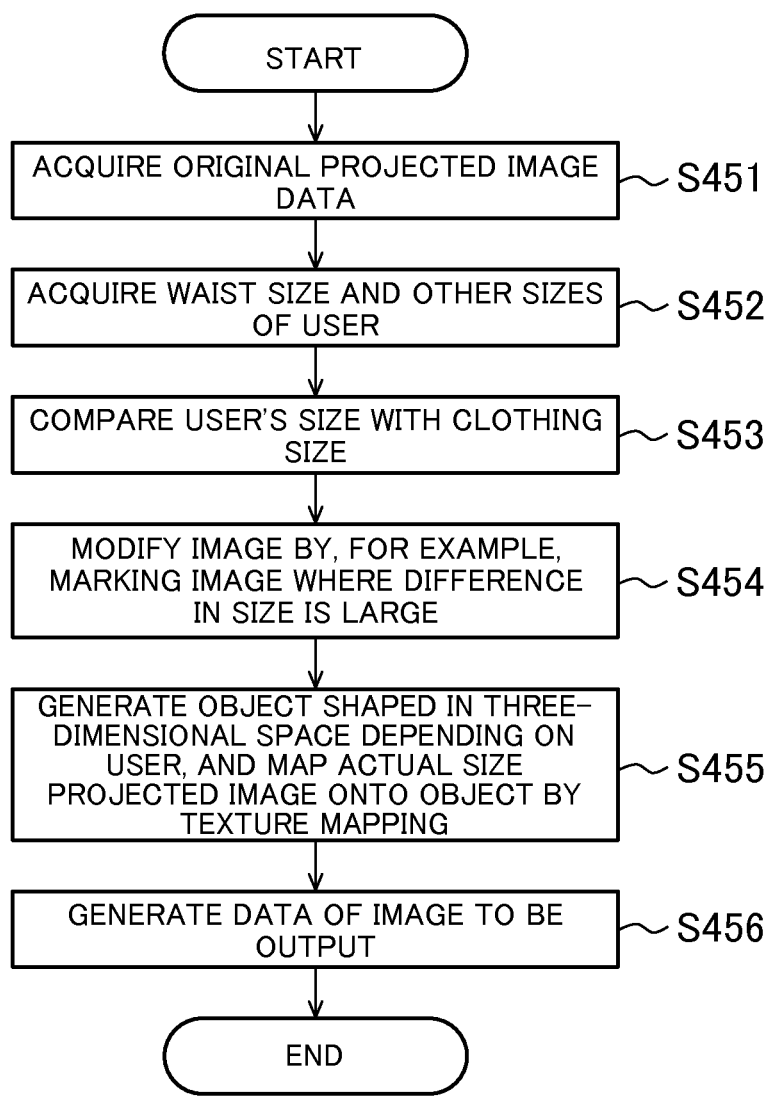
FIG. 18 is a diagram illustrating another example of the processing flow of the projected image adjusting unit.

Details of Step S106 executed by the projected image adjusting unit 57 are not limited to the ones illustrated in FIG. 14. FIG. 18 is a diagram illustrating another example of the processing flow of the projected image adjusting unit 57. The processing described in this example is for the case where clothing is worn by the user.

The projected image adjusting unit 57 first acquires data of a projected image (Step S451). The projected image adjusting unit 57 next acquires the waist size and other sizes of the user (Step S452). The acquired waist size and other sizes may be information that is set as body information in advance, or the projected image adjusting unit 57 may acquire information highly correlated to the waist size and other sizes (such as the shoulder width, the chest width, the protruding of the belly, and the like) from the depth image as the basis for an estimation of the waist size and other sizes.

The projected image adjusting unit 57 next compares the user's size and the size of the clothing or the like (Step S453). The size of the clothing or the like has been acquired as a part of the size image information. Of the plurality of information items about size, the projected image adjusting unit 57 picks out, as information to be notified to the user, a size information item in which the difference between the user's size and the size of the clothing or the like is greater than a predetermined amount. The projected image adjusting unit 57 modifies the projected image accordingly by attaching a mark for notifying the information to the projected image, causing an area of the projected image that is highly relevant to the picked out information item to blink, or the like (Step S454). This processing may be executed also when an image is not projected on a human body.

The projected image adjusting unit 57 then sets an object shaped after the user in a three-dimensional space, and maps by texture mapping the projected image that has been enlarged or reduced to the actual size onto the object (Step S455). The object shaped after the user is a human body model serving as the projection destination, the position of which has been determined by the projection destination recognizing unit 56. In the mapping, positioning for aligning a particular point in the projected image with a particular point in the human body model is executed as well.

The projected image adjusting unit 57 next performs rendering on the image mapped by texture mapping, and generates data of an image to be output (Step S456). The image to be output may be modified so that a portion that does not affect the sense of size much, such as the outline of the top wear, is fit to the actual shape of the human body. The projection control unit 58 may composite the image to be projected with the visible image acquired by the camera 2, and output the composite image to a screen connected to the user client 1.

Figure 19:
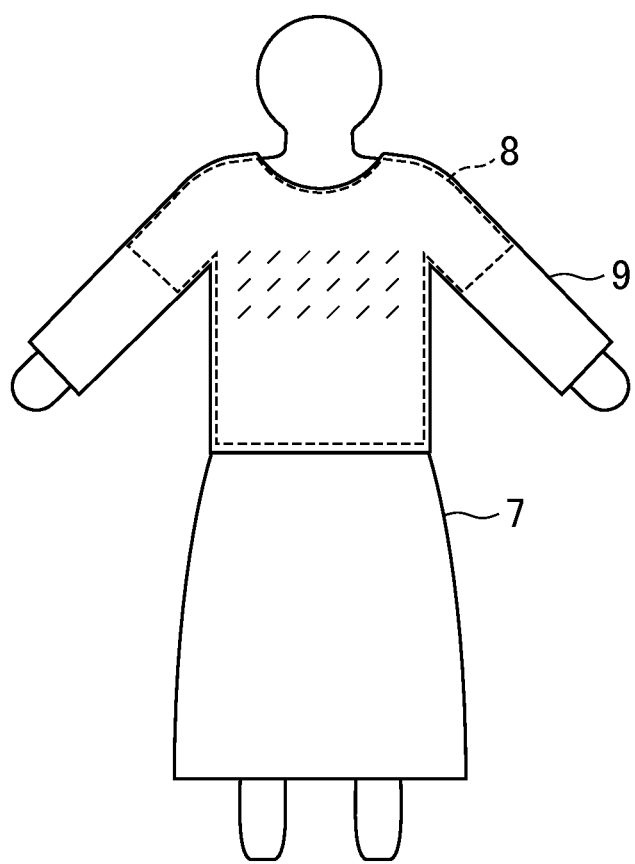
FIG. 19 is a diagram illustrating an example of a bottom wear image projected onto a human body.

FIG. 19 is a diagram illustrating an example of a bottom wear image projected onto a human body. The example of FIG. 19 deals with a case where the user's bust size is larger than the bust size of top wear and the top wear is tight for the user. In this case, the top wear image 8 is projected onto top wear 9, which is being worn by the user, and an image indicating that the clothing is tight around the bust is attached to the top wear image 8 (see the hatched portion of FIG. 19).

In the case of projecting an image of clothing or the like onto a human body, a simple method that does not use the texture mapping described above may be used. For instance, the projected image adjusting unit 57 may acquire an image in which clothing is worn on a mannequin or the like in advance, and output this image onto a virtual projection surface that is acquired from the user's position.

Projecting an image of clothing or the like onto a human body to coordinate clothing or the like at home is particularly effective when a family member wishes to check clothing coordinates for another family member. For instance, in a case that a woman wishes to check clothing coordinates for her husband or child, she is not bothered by taking the husband or child to an actual store for fitting.

The use of the system that has been described is not limited to electronic commerce sessions held at home. The system can be used in actual stores as well.

For example, an image of clothing that is not in stock may be projected beside a piece of clothing that is actually in the store. This is useful when, for example, a user wishes to compare with a piece of clothing that the user has purchased from the store before but has not worn since. The store can deal with such cases by preparing a database of pieces of clothing or the like that the store sold in the past and a database of pieces of clothing that users purchased in the past.

Another application is to project an image of a piece of clothing that is actually in the store onto a human body. Because projecting an image onto a human body is easier than changing clothes for fitting, this is particularly effective when, for example, the user wishes to quickly pick a T-shirt that coordinates best out of T-shirts that differ from one another only in printed design.

The invention claimed is:

1. A clothing image processing system, comprising:
a camera;
a projector;
at least one processor; and
at least one memory device that stores a plurality of instructions, which when executed by the at least one processor, causes the at least one processor to:
acquire a photographed image of a first item from the camera, the first item being placed in a projection direction of the projector and worn on a first part of a human body, the first part being one of a plurality of parts of the human body;
measure a position of a specific portion of the first item in the acquired image, wherein the specific portion of the first item is determined by the first part;
acquire, in an image of a second item which is an item to be worn on a second part, a position of a specific portion of the second item, the second part being one of the plurality of parts of the human body and being different from the first part;
acquire a relative position of the second part from the first cart based on an information indicating human model which is a model of user's body;
determine a position to which the specific portion of the second item is projected based on the measured position of the specific portion of the first item and on the acquired relative position;
recognize a projection target onto which the projector projects;
adjust, based on a distance from the recognized projection target and the position of the specific portion of the second item in the image of the second item, a size and position of the image of the second item that is read out of an item information storing unit and that is to be projected onto the projection target so that a projected position of the specific portion of the second item overlaps with the determined position; and
control the projector so that the adjusted image of the second item is projected.

2. The clothing image processing system according to claim 1,
wherein the first part and the second part are different parts,
wherein the processor of the clothing image processing system is further caused to:
acquire information that indicates a relation between a position of a portion of a human body that corresponds to the specific portion of the first item and a position of a portion of the human body that corresponds to the specific portion of the second item, and
determine, based on the position of the specific portion of the first item and on the information that indicates the relation, the position of the specific portion of the second item when the first item is worn on the human body.

3. The clothing image processing system according to claim 2,
wherein the processor is further caused to determine the position of the specific portion of the second item to be projected in longitudinal direction based on the position of the specific portion of the first item in longitudinal direction and on a distance to the projection target.

4. The clothing image processing system according to claim 1, wherein, based on information about a size of the second item, the processor is further caused to adjust the size of the image of the second item so that the size of the projected image of the second item matches the size of the second item.

5. The clothing image processing system according to claim 1, wherein the processor is further caused to:
detect a position and tilt of a projection surface onto which the image of the second item is projected, and
correct a shape of the image of the second item to be projected onto the projection surface, depending on the detected position and tilt of the projection surface.

6. The clothing image processing system according to claim 1, wherein the processor is further caused to processes the image of the second item so that the first item is prevented from overlapping with the projected image of the second item.

7. The clothing image processing system according to claim 1, wherein the processor is further caused to determine the first part on which the first item is to be worn, based on the photographed image of the first item.

8. The clothing image processing system according to claim 1, wherein the processor is further caused to change a mode of display of the second item based on a result of comparison between a size of a user with respect to clothing and the size of the second item.

9. The clothing image processing system according to claim 1, wherein the processor is further caused to switch the second item to a new second item based on photographed body movement of a user.

10. The clothing image processing system according to claim 1, wherein the processor is further caused to advance electronic commerce processing with respect to the second item, based on photographed body movement of a user.

11. The clothing image processing system according to claim 1,
wherein the processor is further caused to:
recognize a distance between the projection device and a position of the second item to be projected, and
adjust the size of the second item to be projected based on the recognized distance.

12. A clothing image display method which uses a camera, a processor and a memory device that stores a plurality of instructions, the method comprising the steps of:
acquiring a photographed image of a first item from the camera, the first item being placed in a projection direction of a projection device and worn on a first part of a human body, the first part being one of a plurality of parts of the human body;

measuring a position of a specific portion of the first item in the acquired photographed image, wherein the specific portion of the first item is determined by the first part;

acquiring, in an image of a second item which is an item to be worn on a second part, a position of a specific portion of the second item, the second part being one of the plurality of parts of the human body and being different from the first part;

acquiring a relative position of the second part from the first part based on an information indicating human model which is a model of user's body;

determining a position to which the specific portion of the second item is projected based on the measured position of the specific portion of the first item and on the acquired relative position;

recognizing a projection target onto which the projection device projects;

adjusting, based on a distance from the recognized projection target and the position of the specific portion of the second item in the image of the second item, a size and position of the image of the second item that is read out of an item information storing unit and that is to be projected onto the projection target so that a projected position of the specific portion of the second item overlaps with the determined position; and controlling the projection device so that the adjusted image of the second item is projected.

13. A computer-readable non-transitory storage medium having stored thereon a program for causing a computer to:

acquire a photographed image of a first item from a camera, the first item being placed in a projection direction of a projection device and worn on a first part of a human body, the first part being one of a plurality of parts of the human body;

measure a position of a specific portion of the first item in the acquired image, wherein the specific portion of the first item is determined by the first part;

acquire, in an image of a second item which is an item to be worn on a second part, a position of a specific portion of the second item, the second part being one of the plurality of parts of the human body and being different from the first part;

acquire a relative position of the second part from the first part based on an information indicating human model which is a model of user's body;

determine a position to which the specific portion of the second item is projected based on the measured position of the specific portion of the first item and on the acquired relative position;

recognizing a projection target onto which the projection device projects;

adjust, based on a distance from the recognized projection target and the position of the specific portion of the second item in the image of the second item, a size and position of the image of the second item that is read out of an item information storing unit and that is to be projected onto the projection target so that a projected position of the specific portion of the second item overlaps with the determined position; and control the projection device so that the adjusted image of the second item is projected.

\* \* \* \* \*